US006995886B2

(12) United States Patent
Hendriks et al.

(10) Patent No.: US 6,995,886 B2
(45) Date of Patent: Feb. 7, 2006

(54) OPTICAL SCANNING DEVICE

(75) Inventors: Bernardus Hendrikus Wilhelmus Hendriks, Eindhoven (NL); Johannes Joseph Hubertina Barbara Schleipen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 182 days.

(21) Appl. No.: 10/480,352

(22) PCT Filed: Jun. 21, 2002

(86) PCT No.: PCT/IB02/02309

§ 371 (c)(1),
(2), (4) Date: Dec. 9, 2003

(87) PCT Pub. No.: WO03/001520

PCT Pub. Date: Jan. 3, 2003

(65) Prior Publication Data

US 2004/0169906 A1 Sep. 2, 2004

(30) Foreign Application Priority Data

Jun. 21, 2001 (EP) .................................. 01202400
Jan. 17, 2002 (EP) .................................. 02075211

(51) Int. Cl.
*G02B 26/08* (2006.01)
*G02B 17/00* (2006.01)
*G11B 7/135* (2006.01)
(52) U.S. Cl. .................. 359/205; 359/731; 369/112.23
(58) Field of Classification Search ................ 359/204, 359/205, 208, 726–736, 719; 235/454, 462.01, 235/462.02, 470; 369/112.01, 112.23–112.26
See application file for complete search history.

(56) References Cited

U.S. PATENT DOCUMENTS 4,449,212 A 5/1984 Reno ............................ 369/44

(Continued)

FOREIGN PATENT DOCUMENTS

EP      0294902 A1   12/1988
WO      WO0038182    6/2000

OTHER PUBLICATIONS

H. Angus MacLeod, "Thin-Film Optical Filtters", Thired Edition, ISBN 0-85274-784-5, pp. iii-iv, vii-xi, 348-368 and 631-641.

(Continued)

*Primary Examiner*—James Phan

(57) ABSTRACT

An optical scanning device is suitable for scanning a first information layer (23) of a first optical record carrier (21) with a first radiation beam (27) and a second information layer (47) of a second optical record carrier (45) with a second radiation beam (49). The device includes a radiation source (26) and a lens system (24). The radiation source (26) supplies the first and second radiation beams. The lens system has one optical axis (33) and operates: as a catadioptric system for the first radiation beam in order to transform this beam to a first focused radiation beam (35) having a first numerical aperture (NA1) so as to form a first scanning spot (36) in the position of the first information layer, and as a refractive system for the second radiation beam in order to transform this beam to a second focused radiation beam (52) having a second numerical aperture (NA2), different from the first numerical aperture, so as to form a second scanning spot (53) in the position of the second information layer.

11 Claims, 11 Drawing Sheets

Figure 1:
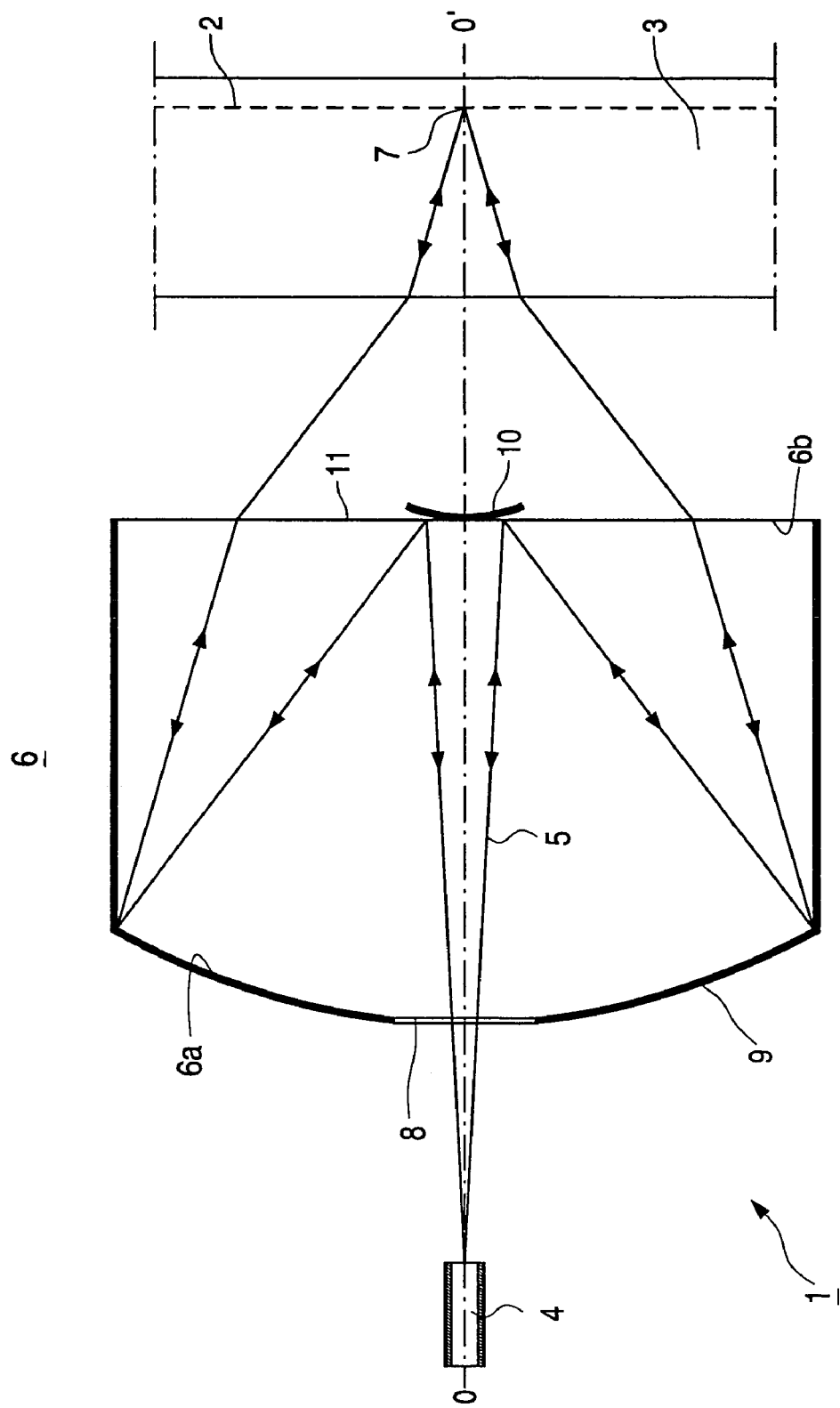

U.S. PATENT DOCUMENTS 4,835,380 A * 5/1989 Opheij et al. ............... 250/216
6,278,560 B1 * 8/2001 Hendriks .................... 359/738

OTHER PUBLICATIONS

Hiroshi Hatano et al., "A Plano-Convex Solid Immersion Mirror with a Small Aperture for Near-Field Optical Data Storage", Int'l Symposium on Optical Memory, pp. 66-69, 2001, ISBN 4-89114-018-6.

B.H.W. Hendriks et al., "Designs and Manufacturing of Faar-Field High NA Objective Lenses for Optcal Recording", pp. 413-414, SPIE 3749, 1999.

G. Bouwhuis et al., "Principles of Optical Disc Systems", pp. 75-80, (Adam Hilger 1985), ISBN 0-85274-785-3.

* cited by examiner

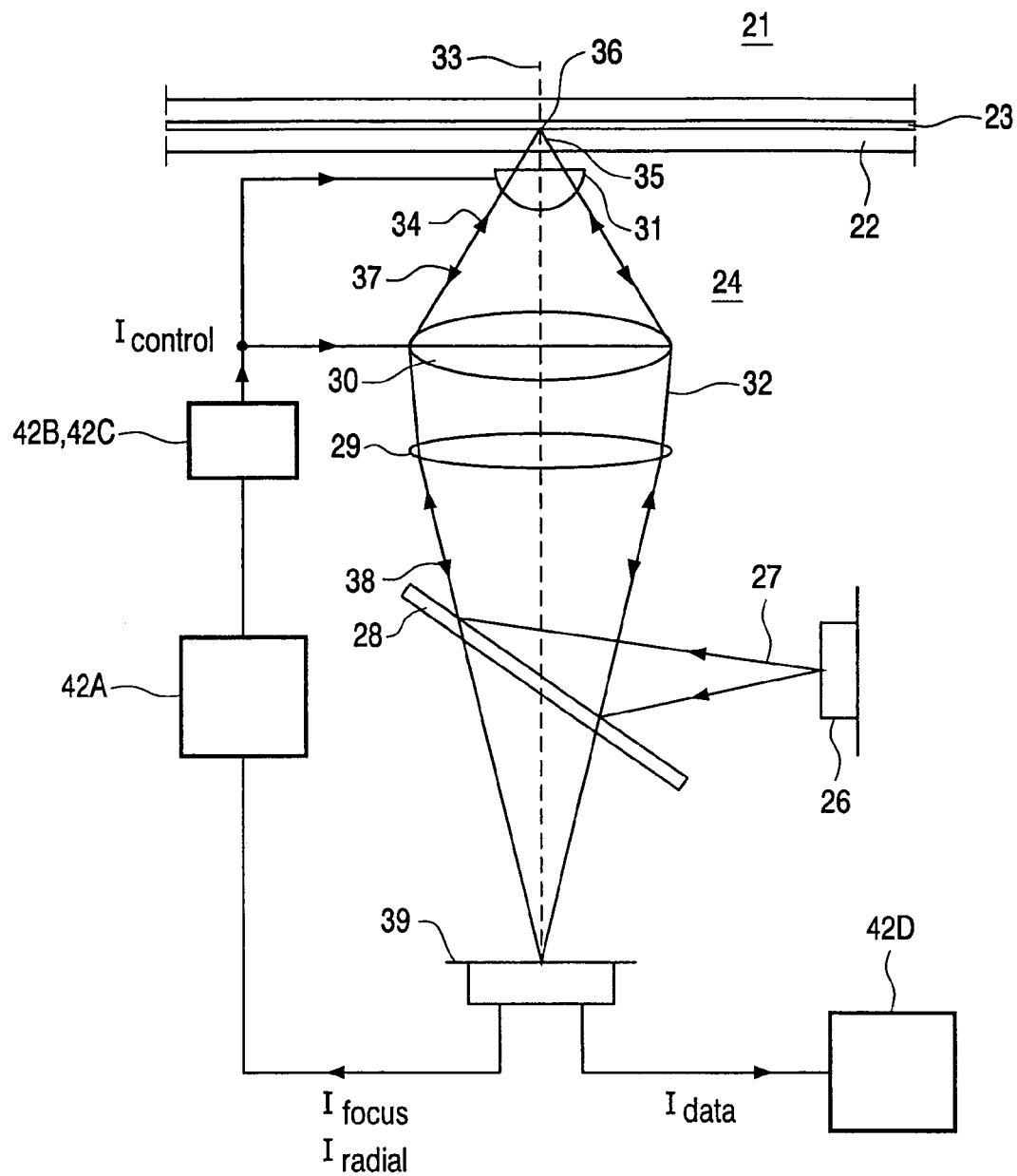
Fig.2A (high node)

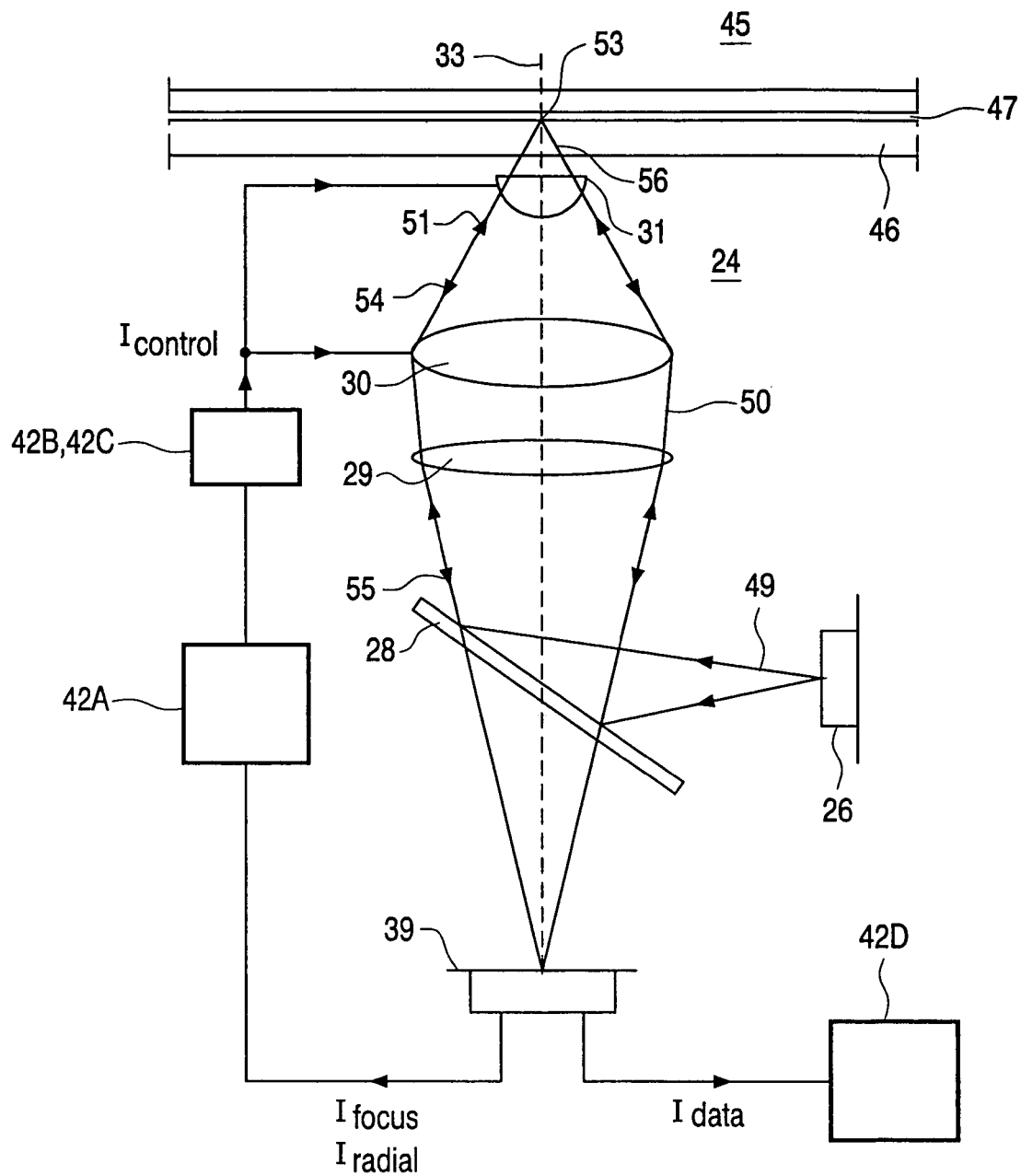
Fig.2B (low node)

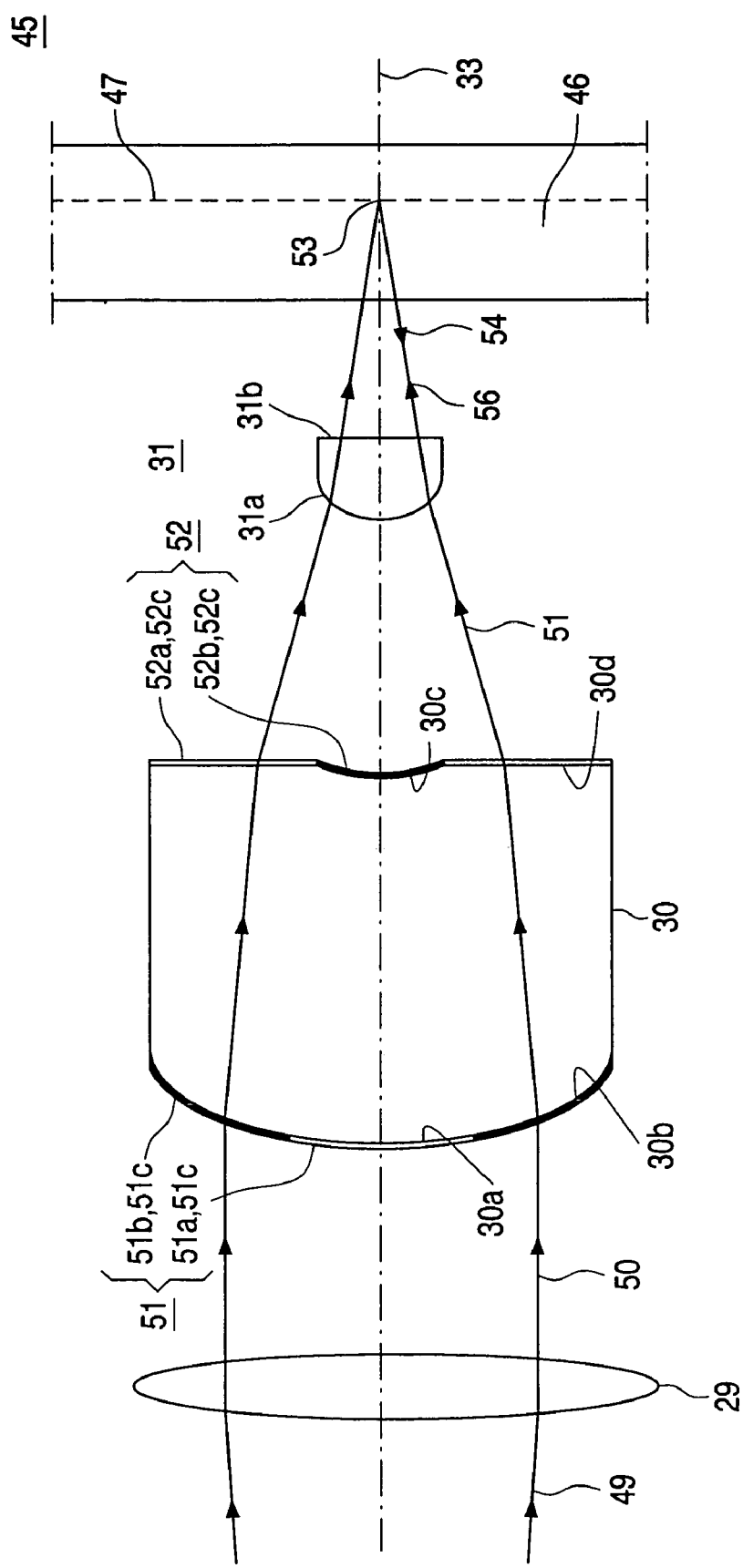
Fig.7B ("low node")

OPTICAL SCANNING DEVICE

The invention relates to an optical scanning device for scanning a first information layer of a first optical record carrier with a first radiation beam and a second information layer of a second optical record carrier with a second radiation beam, the device including a radiation source for supplying the first and second radiation beams and a lens system for transforming the first radiation beam to a first focused radiation beam having a first numerical aperture so as to form a first scanning spot in the position of said first information layer, and the second radiation beam to a second focused radiation beam having a second numerical aperture different from said first numerical aperture so as to form a second scanning spot in the position of said second information layer, the lens system having one optical axis.

The invention also relates to a lens system for transforming a first radiation beam to a first converging radiation beam having a first numerical aperture and a second radiation beam a second radiation beam having a second numerical aperture different from the first numerical aperture, the system having one optical axis.

"Scanning such an information layer" refers to scanning with a radiation beam for: reading information from the information layer ("reading mode"), writing information in the information layer ("writing mode"), and/or erasing information from the information layer.

"Information density" refers to the amount of stored information per unit area of the information layer. It depends, inter alia, on the size of the scanning spot formed by the scanning device on the information layer to be scanned. The information density may be increased by decreasing the size of the scanning spot. Since the size of the spot depends, inter alia, on the wavelength $\lambda$ and the numerical aperture NA of the radiation beam forming the spot, the size of the scanning spot can be decreased by increasing NA and by decreasing $\lambda$.

An optical scanning device as described in the opening paragraph is known from European patent application no. 0,294,902. More specifically, with reference to FIG. 1 of the present description, an optical scanning device 1 is arranged for increasing the numerical aperture of a radiation beam 5 so as to form a scanning spot 7 having a reduced size in an information layer 2 of an optical record carrier 3. Thus, the optical system of the scanning device 1 has an optical axis OO' and includes a radiation source 4 for supplying the scanning beam 5 and an objective lens 6 for transforming the scanning beam 5 to the scanning spot 7 on the information layer 11. The objective lens 6 has an entrance surface 6a facing the radiation source 4 and an exit surface 6b facing the information layer 2. A first radiation window 8 and a concave reflector 9 are arranged on a central part and a marginal part, respectively, of the entrance surface 6a. A convex reflector 10 and a second radiation window 11 are arranged on a central part and a marginal part, respectively, of the exit surface 6b. Typically, during scanning, the radiation beam 5 enters the objective lens 6 via the first radiation window 8 and traverses the objective lens 6. It is then reflected on the convex reflector 10 and traverses the objective lens 6. It is then reflected on the concave reflector 9 and traverses the objective lens 6 again. It emerges from the objective lens 6 via the second radiation window 11 so as to form the spot 7 on the information layer 2.

A problem currently encountered in such a known optical scanning device is the compatibility with optical record carriers having different formats, such as a CD-format disc, a DVD-format disc and a DVR-format disc.

In the following, "first mode" refers to an operating mode of the optical scanning device for scanning the first information layer with the first focused radiation beam having the first numerical aperture NA1; the numerical aperture NA1 is suitable for scanning an optical record carrier of a first type (e.g. a DVR-format disc) that corresponds to a first information density. And "second mode" refers to an operating mode of the optical scanning device for scanning the second information layer with the second focused radiation beam having a second numerical aperture NA2 that is smaller than the numerical aperture NA1; the numerical aperture NA2 is suitable for scanning an optical record carrier of a second type (e.g. a DVD-format disc) that corresponds to a second information density that is smaller than the first information density. In other words, the "first mode" corresponds to a high information density and the "second mode" corresponds to a low information density. By way of illustration only, in case of the DVR-format, the numerical aperture NA1 approximately equals 0.85 for both the "reading mode" and the "writing mode" and, in the case where of the DVD-format, the numerical aperture NA2 approximately equals 0.60 for the "reading mode" and 0.65 for the "writing mode."

The problem currently encountered when scanning in the "second mode" and the "first mode" is that the "free working distance" (i.e. the distance between the information layer to be scanned and the lens system) need be adjusted so that the scanning spot is in focus with the information layer, since the thickness of the transparent layer varies from one format to another. By way of illustration, the thickness of the transparent layer thickness equals 0.1 mm for a carrier of DVR-format and 0.6 mm for a carrier of DVD-format. Accordingly, when scanning carriers of different formats, the free working distance accordingly varies as follows:

$$fwd + \frac{d}{n} = K \quad (1)$$

wherein "fwd" is the free working distance, "d" is the thickness of the transparent layer, "n" is the refractive index of the transparent layer, and "K" is a constant parameter (that is independent of the values of the wavelength and numerical aperture of the scanning spot). According to Equation (1), the free working distance fwd decreases where the thickness d increases, whereas the objective lens remains identical and operates at the same conjugate distance (i.e. the distance between the object and the lens).

In order to make the device described with reference to European patent application no. 0,294,902 suitable for scanning discs having different formats, a first known solution consists in providing the lens system with an actuator.

A disadvantage of such an actuator is that it needs to provide a large amplitude of displacement of the lens system in order to adequately adjust the free working distance. Since making such an actuator is relatively expensive, the cost of manufacturing the device is therefore increased.

The first known solution has also the disadvantage that it not suitable for adjusting the free working distance at low values, i.e. where the free working distance is typically less than a few hundreds of micrometers). Indeed, the change in scanning an optical record carrier having one format, e.g. a DVD-format disc, to scanning another optical record carrier having a different format, e.g. a DVR-format disc, results in a change in thickness of the transparent layer. Such change in thickness of the optical record carrier requires in a change in free working distance, in order to form a scanning spot in the information layer in both cases. The known solution is not able to allow a change in free working distance, in the case where this change approximately equals the actual value of the free working distance, as it is the case where scanning a DVR-format disc. Thus, the known solution is not satisfactory to resolve the problem of making an optical scanning device that is suitable for scanning two different formats of optical record carriers (that is, for operating in the "second mode" and the "first mode," especially where the free working distance needs be adjusted at low values for operating in the "first mode."

A second known solution is disclosed in the PCT application WO 00/38182, wherein an optical scanning device of the type described in the opening paragraph includes a lens system including a first objective lens and a second objective lens that form a doublet-lens system.

A disadvantage of such a solution is that, when the scanning spot is changed from the first information layer to the second information layer, the position of the lens system needs be adapted to be closer to the information layer so as to position the scanning spot on the first information layer. The distance between the objective lens and the plano-convex lens is then adjusted so that the scanning spot may be focused either on the first information layer or on the second information layer.

An object of the invention is to provide an optical scanning device of the type described in the opening paragraph, that is suitable for operating both in the "second mode" and in the "first mode," and that does not have the above disadvantages. It is also an object of the invention to provide a lens system of the type described in the opening paragraph, that is suitable for transforming a first radiation beam to a first focused radiation beam having a first numerical aperture and a second radiation beam to a second focused radiation beam having a second numerical aperture different from the first numerical aperture.

To achieve this object, the lens system of an optical scanning device according to the invention operates as: a catadioptric system for the first radiation beam in order to transform this beam to a first focused radiation beam having a first numerical aperture so as to form a first spot in the position of the first information layer, and a refractive system for the second radiation beam in order to transform this beam to a second focused radiation beam having a second numerical aperture, different from the first numerical aperture, so as to form a second spot in the position of the second information layer.

An advantage of the lens system that can operate both as a catadioptric system and as a refractive system is to form the first and second scanning spots in the positions of the first and second information layers, respectively, in the case, e.g., where the device is operating in the "first mode" and in the "second mode," respectively. In other words, the change for scanning in one mode, e.g. the first mode, to another mode, e.g. the second mode, does not need further adjustment of the free working distance with mechanical means, in order to make the device suitable for operating in the first mode and in the second mode.

Another advantage of such a lens system is that it does not need an actuator capable of providing a large displacement of the objective lens, as opposed to the first known solution.

In a preferred embodiment of the optical scanning device according to the invention, the lens system includes a first objective lens and a second objective lens that forms a doublet-lens system.

An advantage of such a lens system is that the distance between the first and second objective lenses need not be adjusted to make the device suitable for operating in the first mode and in the second mode, as opposed to the second known solution.

To achieve the aforementioned object, a lens system according to the invention further includes:

a first objective lens having an entrance surface for receiving the first and second radiation beams and an exit surface for outputting the first and second converging radiation beams, the lens being transmissive for the first and second radiation beams, a first optical structure facing the entrance surface of the first objective lens, this structure including a first part which is transmissive for the first radiation beam, a non-overlapping second part which is reflective for the first radiation beam, and a third part which is transmissive for the second radiation beam, and a second optical structure arranged facing the exit surface of the first objective lens, this structure including a fourth part which is reflective for the first radiation beam, a non-overlapping fifth part which is transmissive for the first radiation beam, and a sixth part which is transmissive for the second radiation beam.

Figure 3:
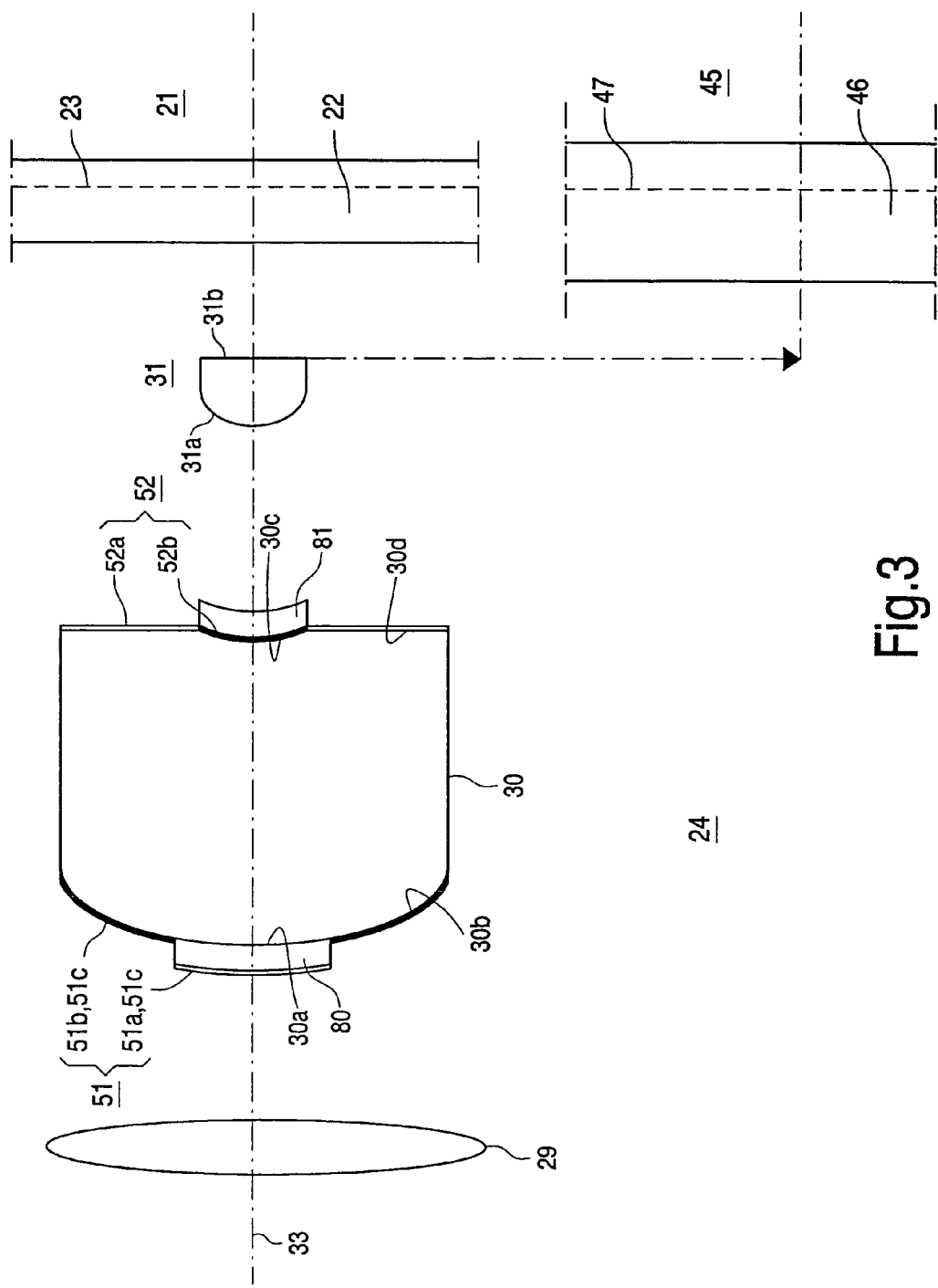
Figure 4A:
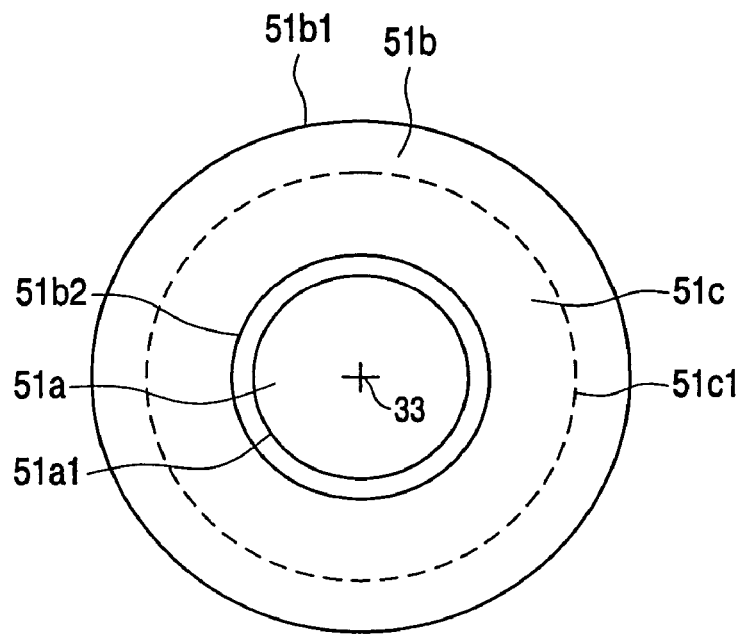
Figure 4B:
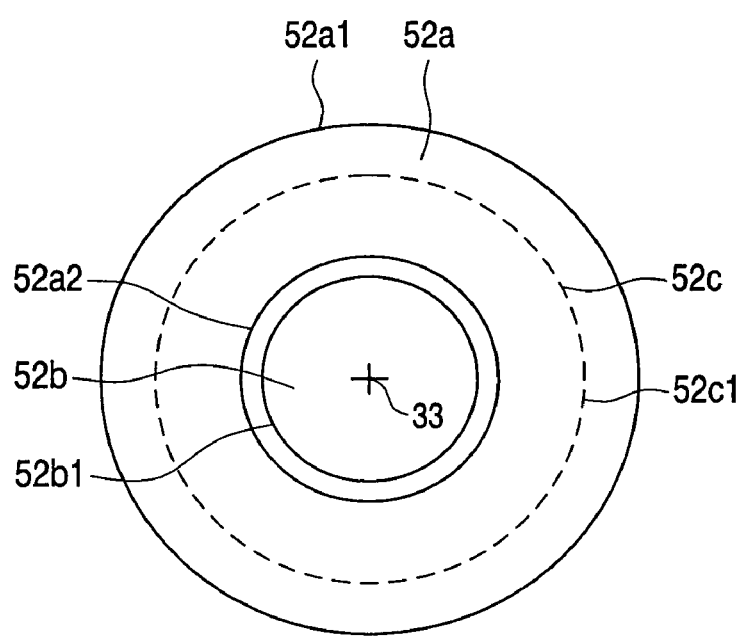
Figure 5:
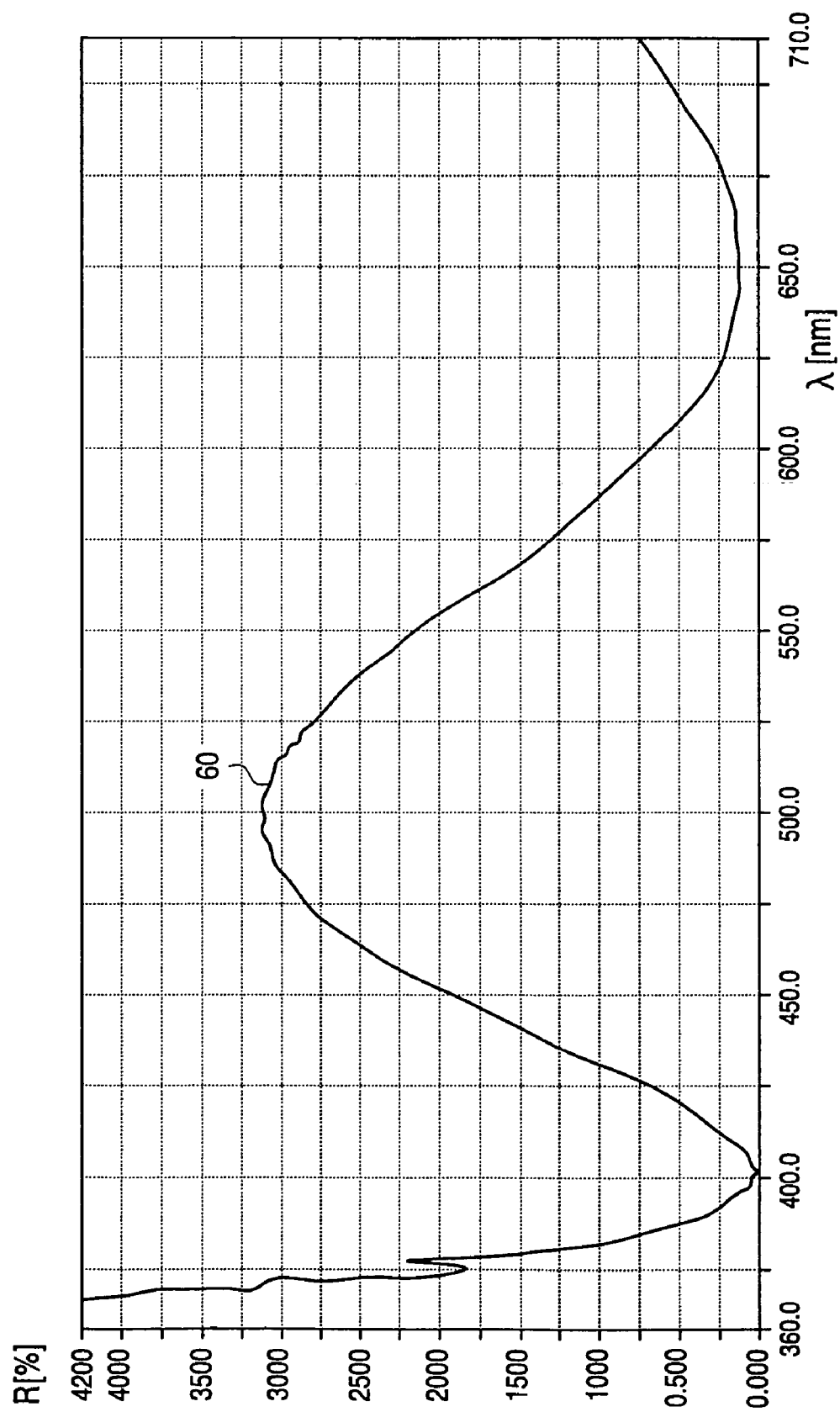
Figure 6:
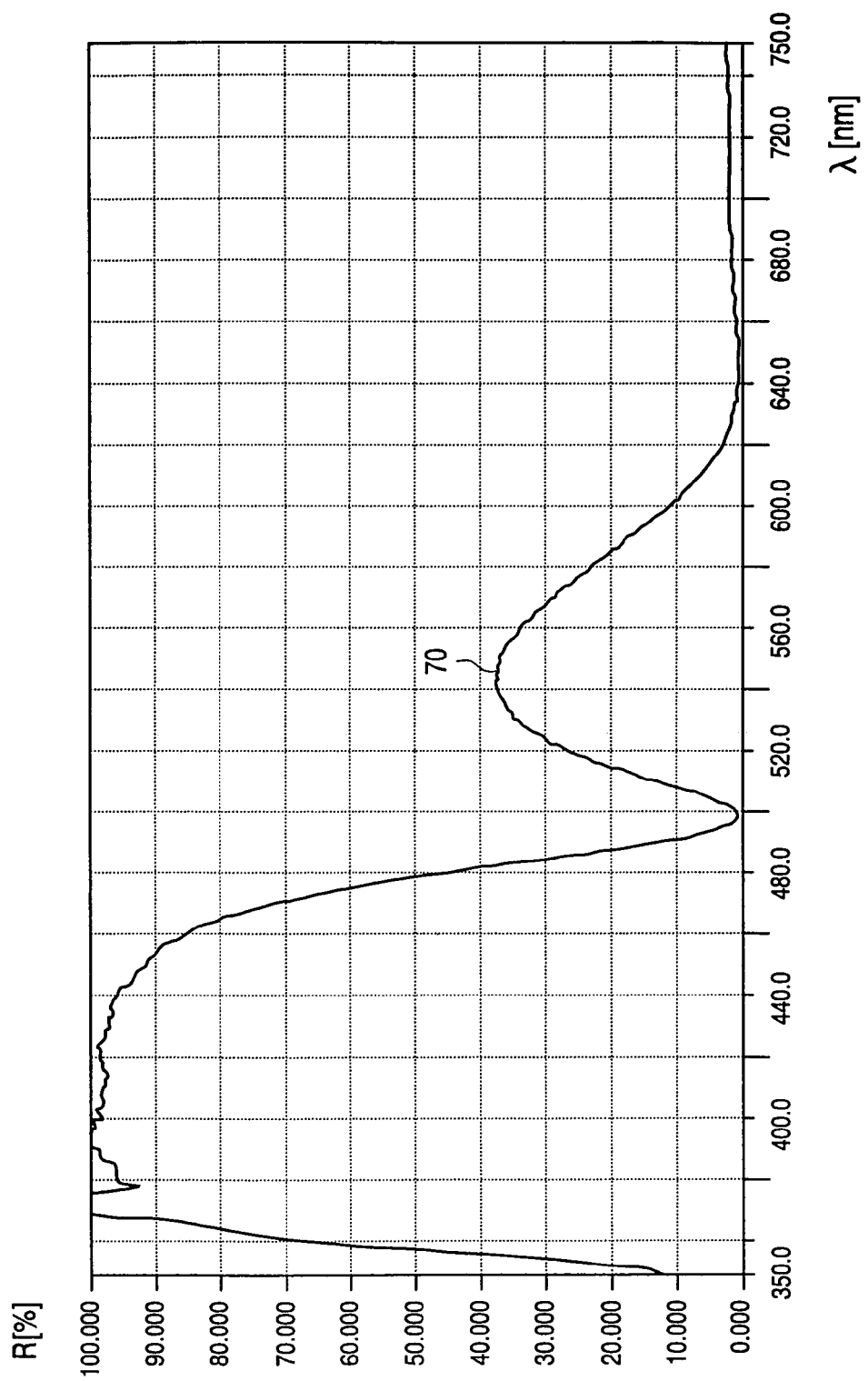
Figure 7A:
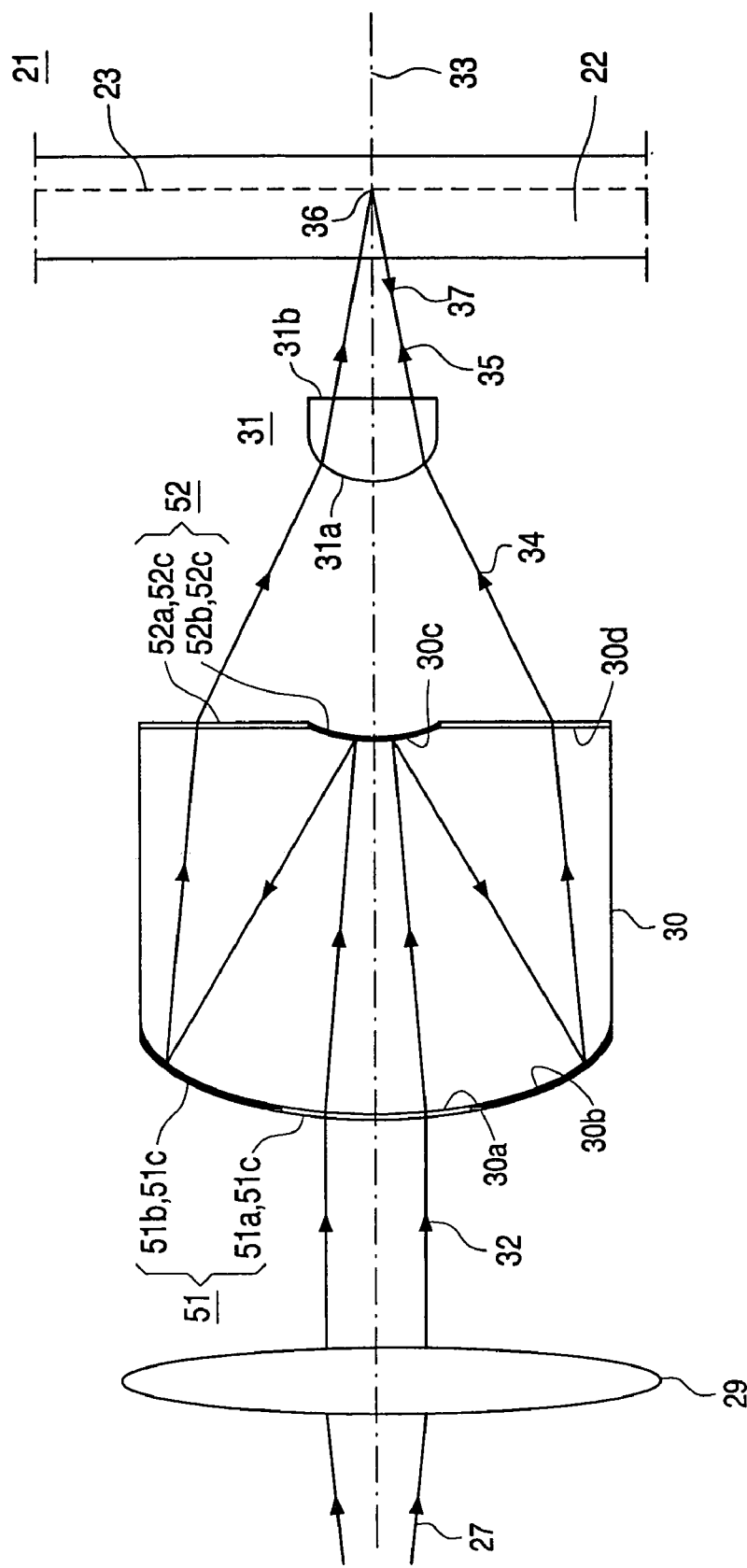
Figure 8:
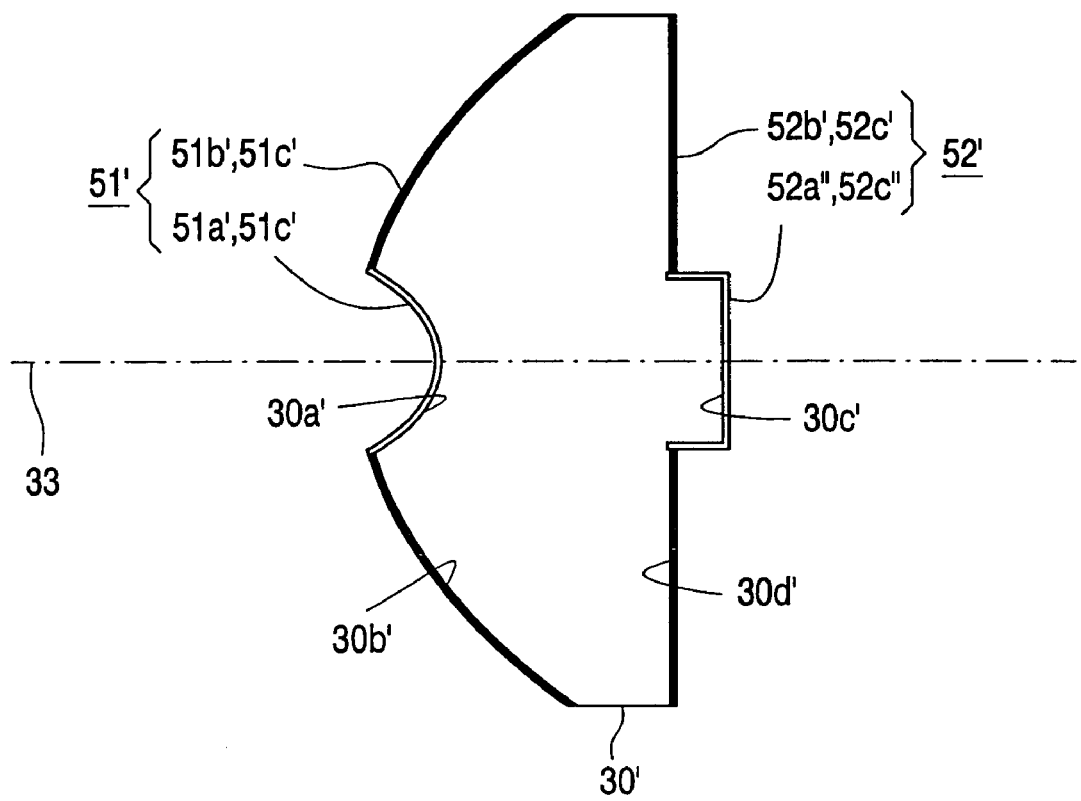
Figure 9:
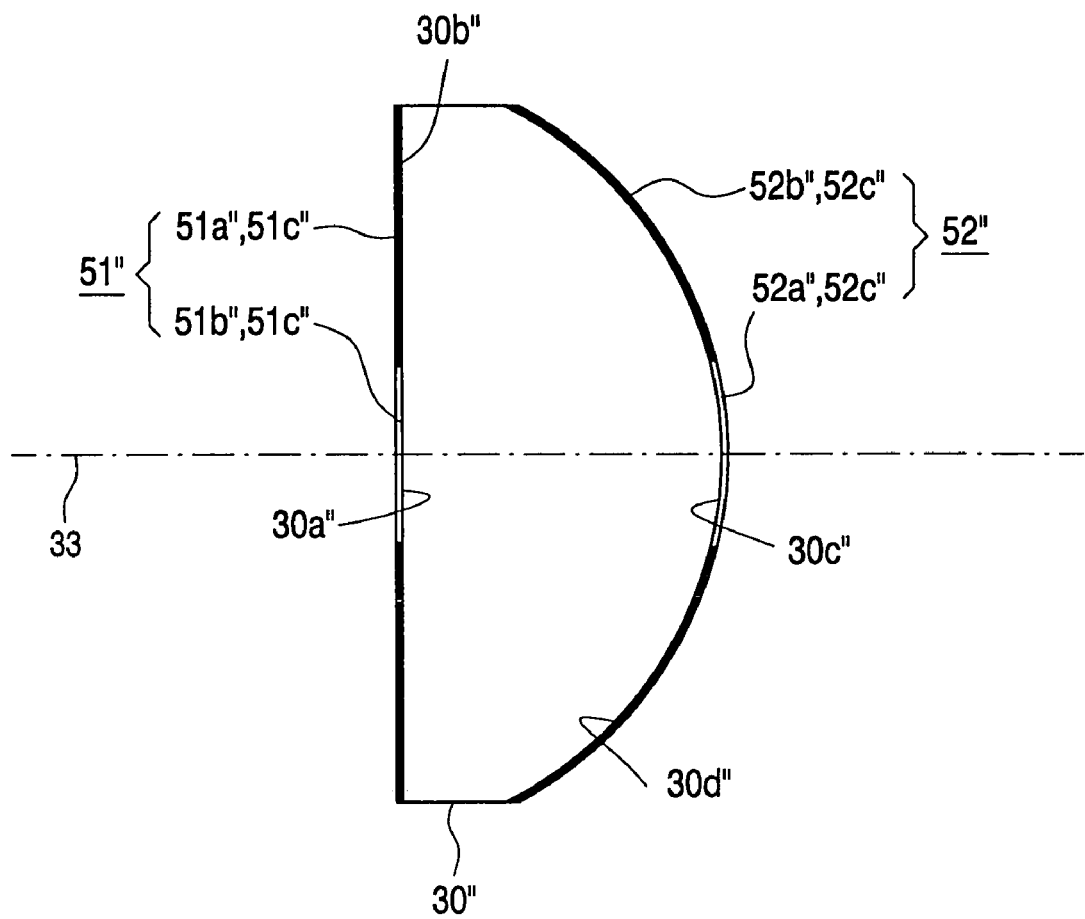

The objects, advantages and features of the invention will be apparent from the following, more detailed description of the invention, as illustrated in the accompanying drawings, in which:

FIG. 1 shows a known optical scanning device,

FIG. 2A shows an optical scanning device according to the invention when scanning an optical record carrier of a first format ("first mode"), FIG. 2B shows the optical scanning device of FIG. 2A when scanning an optical record carrier of a second format ("second mode"), FIG. 3 shows in detail a first embodiment of the lens system of FIG. 2A and FIG. 2B, FIG. 4A shows the cross-section of the first structure shown in FIG. 3, FIG. 4B shows the cross-section of the second structure shown in FIG. 3, FIG. 5 shows a curve that represents the reflective coefficient of a first coating, in relation to the first and second embodiments of FIGS. 3 and 4, FIG. 6 shows a curve that represents the reflective coefficient of a second coating, in relation to the first and second embodiments of FIGS. 3 and 4, FIG. 7A shows rays of the radiation beams when the optical scanning device of FIG. 2A is operating in the "first mode", FIG. 7B shows rays of the radiation beams when the optical scanning device of FIG. 2B is operating in the "second mode", FIG. 8 shows in detail a second embodiment of the objective lens and of the first and second optical structures shown in FIG. 3, and FIG. 9 shows in detail a third embodiment of the objective lens and of the first and second optical structures shown in FIG. 3.

An optical scanning device according to the invention is suitable for scanning at least two different types or formats of optical record carriers. FIG. 2A shows the optical scanning device in the "first mode," for scanning an information layer 23 of an optical record carrier 21 of the first type. FIG. 2B shows the same optical scanning device in the "second mode," for scanning an information layer 47 of an optical record carrier 45 of the second type.

The optical record carrier 21 comprises a transparent layer 22, one side of which is provided with an information layer 23. The side of the information layer facing away from the transparent layer may be protected from environmental influences by a protective layer. The transparent layer 22 acts as a substrate for the carrier 21 by providing mechanical support for the information layer 23. Alternatively, the transparent layer 22 may have the sole function of protecting the information layer 23, while the mechanical support is provided by a layer on the other side of the information layer 23, for instance by the protection layer or by an additional information layer and transparent layer connected to the uppermost information layer. The information layer 23 is a surface of the carrier 21 that contains tracks. A "track" is a path to be followed by a focused radiation beam on which path optically-readable marks that represent information are arranged. The marks may be, e.g., in the form of pits or areas with a reflection coefficient or a direct of magnetization different from the surroundings. By way of illustration only, in the case where the optical record carrier 21 is of the DVR-format, the thickness of the transparent layer 22 approximately equals 0.1 mm.

The optical record carrier 45 comprises a transparent layer 46, one side of which is provided with an information layer 47. The transparent layer 46 has a larger thickness than the transparent layer 22 of the optical record carrier 41 of the first type. The information layer 47 may have a lower information density than the information layer 23 of the optical record carrier 21. By way of illustration only, in the case where the carrier 45 is of DVD-format, the thickness of the transparent layer 46 approximately equals 0.6 mm.

As shown in FIG. 2A and FIG. 2B, the optical scanning device includes a radiation source 26 and a lens system 24 having one optical axis 33. The optical scanning device may further include a beam splitter 28, a detection system 39, a servosystem 42A, a focus actuator 42B and a radial actuator 42C, and an information processing unit 42D for error correction.

The radiation source 26 is arranged for supplying a first radiation beam 27 for scanning the information layer 23 and a second radiation beam 49 for scanning the information layer 47. Preferably, the radiation source 26 includes at least a first semiconductor laser that emits the radiation beam 27 at a first selected wavelength λ1 and a second semiconductor laser that emits the radiation beam 49 at a second selected wavelength λ2. By way of illustration only, in the case where the optical record carrier 21 is of DVR-format, the wavelength λ1 preferably equals 405 nm and, in the case where the optical record carrier 45 is of DVD-format, the wavelength λ2 preferably equals 660 nm.

The beam splitter 28 is arranged for reflecting the radiation beams 27 and 49 toward the lens system 24. Preferably, the beam splitter 28 is formed by a plane parallel plate that is tilted with respect to the optical axis 33.

More importantly, the lens system 24 is arranged for operating: (1) in the "first mode" as a catadioptric system for transforming the reflected radiation beam 27 to a first focused radiation beam 35 having a first numerical aperture NA1 so as to form a first spot 36 in the position of the information layer 23, and (2) in the "second mode" as a refractive system for transforming the reflected radiation beam 49 to a second focused radiation beam 56 having a second numerical aperture NA2 so as to form a second spot 53 in the position of the information layer 47, wherein the numerical aperture NA2 is smaller than the numerical aperture NA1. The arrangement of the lens system 24 is described below in further detail.

Thus, when the optical scanning device operates in the "first mode," the focused radiation beam 35 reflects on the information layer 23, thereby forming a reflected beam 37 which returns on the optical path of the forward converging beam 34. The lens system 24 transforms the reflected radiation beam 37 to a first converging reflected radiation beam 38. Finally, the beam splitter 28 separates the forward radiation beam 27 from the reflected radiation beam 38 by transmitting at least part of the reflected radiation beam 38 towards the detection system 39. When the optical scanning device operates in the "second mode," the focused radiation beam 56 reflects on the information layer 47, thereby forming a reflected beam 54 which returns on the optical path of the forward converging beam 51. The lens system 24 transforms the reflected radiation beam 54 to a second converging reflected radiation beam 55. Finally, the beam splitter 28 separates the forward radiation beam 49 from the reflected radiation beam 55 by transmitting at least part of the reflected radiation beam 55 towards the detection system 39.

The detection system 39 is arranged for capturing the reflected beams 38 and 55 and converting them into one or more electric signals. One of the signals is an information signal $I_{data}$, the value of which is representative of the information scanned from the information layers 23 and 47, respectively. The information signal $I_{data}$ may be processed by the information processing unit 42D for error correction of the information extracted from the information layers 23 and 47. Other signals from the detection system 39 are a focus error signal $I_{focus}$ and a radial tracking error signal $I_{radial}$. The signal $I_{focus}$ represents the axial difference in height along the optical axis 33 between the scanning spot 36 (the scanning spot 53, respectively) and the information layer 23 (the information layer 47, respectively); it is further used for maintaining the scanning spot in focus in the information layer (as described below). The signal $I_{focus}$ is formed from the commonly used "astigmatic method" which is known from, inter alia, the book by G. Bouwhuis, J. Braat, A. Huijser et al, "Principles of Optical Disc Systems," 75–80 (Adam Hilger 1985) (ISBN 0-85274-785-3). The signal $I_{radial}$ represents the distance in the plane of the information layer 23 (the information layer 47, respectively) between the scanning spot 36 (the scanning spot 53, respectively) and the center of a track in this information layer to be followed by this scanning spot; it is further used for maintaining the scanning spots 36 and 53 on track in the information layers 23 and 47, respectively. The signal $I_{radial}$ is formed from the commonly used "radial push-pull method" which is known from, inter alia, the book by G. Bouwhuis, J. Braat, A. Huijser et al, "Principles of Optical Disc Systems," 70–73 (Adam Hilger 1985) (ISBN 0-85274-785-3).

The servosystem 42A is arranged for, in response to the signals $I_{focus}$ and $I_{radial}$, providing servo control signals $I_{control}$ for controlling the focus actuator 42B and the radial actuator 42C, respectively. The focus actuator 42B controls the positions of the lens system 24 along the optical axis 33, thereby controlling the actual positions of the scanning spots 36 and 53 such that they coincide substantially with the planes of the information layers 23 and 47, respectively. The radial actuator 42C controls the position of the lens system 24 in a direction perpendicular to the optical axis 33, thereby controlling the radial positions of the scanning spots 36 and 53 such that they coincide substantially with the center lines of the tracks to be followed in the information layers 23 and 47, respectively.

The lens system 24 is now described in further detail. FIG. 3 shows a first embodiment of the lens system 24 that includes a first objective lens 30, a first optical structure 51 and a second optical structure 52. The lens system 24 further includes a collimator lens 29 and a second objective lens 31.

The collimator lens 29 is arranged for transforming the radiation beams 27 and 49 to a first collimated radiation beam 32 and a second collimated radiation beam 50, respectively.

The first objective lens 30 is arranged for transforming the collimated radiation beams 32 and 50 to a first converging radiation beam 34 and a second converging radiation beam 51, respectively. Thus, the objective lens 30 has an entrance surface for receiving the radiation beams 32 and 50 and an exit surface for outputting the converging beams 34 and 51. Furthermore, the objective lens 30 is transmissive for both the radiation beams 32 and 50.

The optical structure 51 is arranged between the radiation source 26 and the entrance surface of the objective lens 30. FIG. 4A shows the cross-section of the first structure shown 51 that includes a first part 51a, a non-overlapping second part 51b and a third part 51c.

The part 51a is transmissive for the radiation beam 32. As shown in FIG. 4A, this part is a central part (that is, in an area centered on the optical axis 33) and has an outer boundary 51a1.

The part 51b is reflective for the radiation beam 32. As shown in FIG. 4A, this part is a marginal part (that is, in an annular area around the central part 51a) and has an outer boundary 51b1 and an inner boundary 51b2 so that the part 51b that does not overlap the part 51a. Notably, there may be a space between the boundaries 51b2 and 51a1 or these boundaries may coincide. In the following and as shown in FIG. 3, the boundaries 51b2 and 51a1 coincide.

The part 51c is transmissive for the radiation beam 50. As shown in FIG. 4A, this part has an outer boundary 51c1 that extends between the boundaries 51b1 and 51b2. In other words, the part 51c may include the part 51a and/or the part 51b. As an alternative to the configuration shown in FIG. 4A, the part 51c may be annular and therefore has an inner boundary. In the following, the part 51c includes the parts 51a and 51b, as shown in FIG. 3. The optical structure 51 preferably further includes a first phase compensating element for compensating the difference in phase (due to a difference in optical path) between the part of the radiation beam 50 traversing the part 51a and the part of the radiation beam 50 traversing the part 51b. By way of illustration only, as shown in FIG. 3, such a compensating element may be formed by a first layer 80 arranged between the collimator lens 29 and the entrance surface of the objective lens 30. Preferably, the entrance surface of the first objective lens 30 may be designed so that the first layer has a cross-section that overlaps the part 51a. Furthermore, the first layer has a predetermined thickness "t1" so that the difference in phase between the radiation beam traversing the first layer and the radiation beam traversing the part 51b equals the difference in phase between the radiation beam traversing the part 51b and the radiation beam traversing the part 51a. In the case where the first layer has a uniform refractive index, the thickness t1 may be defined as follows:

$$t1 = \frac{\phi \cdot \lambda}{2\pi \cdot (n-1)}$$

wherein "$\phi$" is the difference in phase between the radiation beam traversing the part 51b and the radiation beam traversing the part 51a, "$\lambda$" is the wavelength of the radiation beam traversing the first layer, and "n" is the refractive index of the first layer.

The optical structure 52 is arranged between the exit surface of the objective lens 30 and the positions of the information layers 23 and 47. FIG. 4B shows the cross-section of the second structure 52 that includes a fourth part 52b, a non-overlapping fifth part 52a and a sixth part 52c.

The part 52b is reflective for the radiation beam 32. As shown in FIG. 4B, this part is a central part (that is, in an area centered on the optical axis 33) and has an outer boundary 52b1.

The part 52a is transmissive for the radiation beam 32. As shown in FIG. 4B, this part is a marginal part (that is, in an annular area around the central part 52b) and has an outer boundary 52a1 and an inner boundary 52a2 so that part 52a does not overlap the part 52b. Notably, there may be a space between the boundaries 52b1 and 52a2 or these boundaries may coincide. In the following and as shown in FIG. 3, the boundaries 52b1 and 52a2 coincide.

The part 52c is transmissive for the radiation beam 50. As shown in FIG. 4B, this part has an outer boundary 52c1 that extends between the boundaries 52b1 and 52b2. In other words, the part 52c may include the part 52a and/or the part 52b. As an alternative to the configuration shown in FIG. 4B, the part 52c may be annular and therefore has an inner boundary. In the following, the part 52c includes the parts 52a and 52b, as shown in FIG. 3. The optical structure 52 preferably further includes a second phase compensating element for compensating the difference in phase (due to the difference in optical path) between the part of the radiation beam 50 traversing the part 52a, and the part of the radiation beam 50 traversing the part 52b. By way of illustration only, as shown in FIG. 3, such a compensating element may be formed by a second layer 81 arranged between the exit surface of the objective lens 30 and the second objective lens 31. The second layer 81 may be formed similarly to the first layer 80, especially in terms of thickness.

Notably, the parts 51a and 51b, as well as the parts 52a and 52b, are said to be non-overlapping. In other words, e.g. with reference to FIG. 4A, a cross-section of the radiation beam 50 that is incident to the optical structure 51 has a first area that is affected by the optical properties of the part 51a (i.e. transmission) and a second area that does not overlap the first area and that is affected by the optical properties of the part 51b (i.e. reflection).

The second objective lens 31 is arranged for transforming the converging radiation beams 34 and 51 to the focused beams 35 and 52, respectively. It may be formed by a plano-convex lens 31 having: a convex entrance surface 31a that faces the exit surface of the objective lens 30, and a flat exit surface 31b that faces the positions of the information layers 23 and 47. Notably, the second objective lens 31 forms, in cooperation with the first objective lens 30, a doublet-lens system that is advantageously easier to manufacture than a single-lens system in terms of mechanical tolerances. Another advantage of the doublet-lens system is that it is less sensitive to the mutual adjustment of the first and second objective lenses. As a result of the above, the amount of optical aberration, such as spherical aberration and coma aberration, generated by the doublet-lens system may be better controlled.

The preferred embodiments of the optical structures 51 and 52 shown in FIG. 3 are now described in more detail: these structures are made of coatings which are sensitive to the radiation beams 32 and 50 so as to be transmissive and/or reflective for the radiation beams 32 and 50. By way of illustration only, these coatings are chosen to be wavelength-sensitive so that the part 51b is reflective for the wavelength λ1 and transmissive for the wavelength λ2 and the part 51a is transmissive for the wavelengths λ1 and λ2. For instance, as shown in FIGS. 3 and 4, the part 51a may be made by a first coating deposited on a central part 30a of the entrance surface of the objective lens 30 and the part 51b may be made by a second coating deposited on a marginal part 30b of the entrance surface of the objective lens 30. The materials, thicknesses and refractive indices of the film(s) of the first coating are chosen so that this coating is transmissive for the wavelengths λ2 and λ1. By way of illustration only, Table 1 shows an example of such films (here, two films form the first coating).

TABLE 1

| Film | Material | Refractive index | Thickness (nm) |
|------|----------|------------------|----------------|
| #1 | $SiO_xN_y$ | 1.90 | 133.28 |
| #2 | $SiO_2$ | 1.45 | 85.59 |

FIG. 5 shows a curve 60 that illustrates the evolution of the reflective coefficient R for the first coating made as shown in Table 1, with the wavelength λ of the radiation beam that traverses this coating. The curve 60 has two minima (R≈0) where the wavelength λ equals 405 and 660 nm: the first coating made as shown in Table 1 is transmissive for the wavelengths λ1 and λ2 that equal 405 and 660 nm, respectively.

The materials, thicknesses and refractive indices of the film(s) of the second coating are chosen so that this coating is reflective for the wavelength λ1 and transmissive for the wavelength λ2. By way of illustration only, Table 2 shows an example of such films (here, eleven films form the second coating).

TABLE 2

| Film | Material | Refractive index | Thickness (nm) |
|------|----------|------------------|----------------|
| #1 | $Ta_2O_5$ | 2.19 | 35.78 |
| #2 | $SiO_2$ | 1.45 | 66.08 |
| #3 | $Ta_2O_5$ | 2.19 | 51.89 |
| #4 | $SiO_2$ | 1.45 | 80.21 |
| #5 | $Ta_2O_5$ | 2.19 | 47.84 |
| #6 | $SiO_2$ | 1.45 | 53.86 |
| #7 | $Ta_2O_5$ | 2.19 | 42.39 |
| #8 | $SiO_2$ | 1.45 | 78.57 |
| #9 | $Ta_2O_5$ | 2.19 | 53.05 |
| #10 | $SiO_2$ | 1.45 | 74.2 |
| #11 | $Ta_2O_5$ | 2.19 | 35.71 |

FIG. 6 shows a curve 70 that illustrates the evolution of the reflective coefficient R for the second coating made as shown in Table 2, with the wavelength λ of the radiation beam that traverses this coating. The curve 70 has a minimum (R≈0) where the wavelength λ equals 660 nm and a maximum (R≈1) where the wavelength equals 405 nm: the second coating is transmissive for the wavelength λ2 that equals 660 nm and reflective for the wavelength λ1 that equals 405 nm.

Similarly to the optical structure 51 as described above with reference to Tables 1 and 2, the optical structure 52 may be made, e.g., as follows. As shown in FIG. 3, the part 52a may be made by a third coating that is similar to the first coating described in Table 1 and that is deposited on a marginal part 30d of the exit surface of the objective lens 30 and the part 52b may be made by a fourth coating that is similar to the second coating described in Table 2 and that is deposited on a central part 30c of the exit surface of the objective lens 30. In other words, the optical structure 51 operates as a mirror with a central hole and the optical structure 52 as a central mirror.

Notably, the embodiments described above with reference to FIG. 3 and Tables 1 and 2 are suitable in the case where the carrier 21 is of DVR-format and the carrier 45 is of DVD-format.

The operation of the optical scanning device as shown in FIGS. 2A, 2B and 3 is now described in detail, with reference to FIGS. 7A and 7B that show rays of the radiation beams traversing the lens system 24, when the device is operating in the "first mode" and the "second mode," respectively.

When the optical scanning device is operating in "first mode," the radiation source 26 supplies the radiation beam 27 at the wavelength λ1 for scanning the information layer 23. The lens system 24 operates as a catadioptric system for transforming the radiation beam 27 to the focused radiation beam 35 that has the numerical aperture NA1, so as to form the spot 36 in the position of the information layer 23.

More precisely, the collimator lens 29 transforms the radiation beam 27 to the collimated radiation beam 32. The radiation beam 32 then reaches the optical structure 51. The part 51a transmits the collimated radiation beam 32, since the wavelength of this beam equals λ1. The radiation beam 32 enters the objective lens 30, via its entrance surface. The objective lens 30 transmits the radiation beam 32, since the wavelength of this beam equals λ1. Thus, the radiation beam 32 traverses the objective lens 30, from its entrance surface to its exit surface, and then reaches the optical structure 52. The part 52b reflects the radiation beam 32, since the wavelength of this beam equals λ1. The radiation beam 32 then traverses the objective lens 30, from its exit surface to its entrance surface, and then reaches the optical structure 51. The part 51b reflects the radiation beam 32, since the wavelength of this beam equals λ1. The radiation beam 32 then traverses again the objective lens 30, from its entrance surface to its exit surface, and then reaches the optical structure 52. The part 52a transmits the radiation beam 32, since the wavelength of this beam equals λ1. And the radiation beam 32 emerges from the objective lens 30, via its exit surface and the optical structure 52, in the form of the converging radiation beam 34. Finally, the second objective lens 31 transforms the converging radiation beam 34 to the focused beam 35, so as to form the spot 36 on the information layer 23.

When the optical scanning device is operating in the "second mode," the radiation source 26 supplies the radiation beam 49 at the wavelength λ2 for scanning the information layer 47. The lens system 24 operates as a refractive system for transforming the radiation beam 49 to the focused radiation beam 56 that has the numerical aperture NA2, so as to form the spot 53 in the position of the information layer 47, wherein the numerical aperture NA2 is smaller than the numerical aperture NA1.

More precisely, the collimator lens 29 transforms the radiation beam 49 to the collimated radiation beam 50. The radiation beam 50 then reaches the optical structure 51. The parts 51a and 51b transmit the collimated radiation beam 50, since the wavelength of this beam equals λ2. The radiation beam 50 enters the objective lens 30, via its entrance surface. The objective lens 30 transmits the radiation beam 50, since the wavelength of this beam equals λ2. Thus, the radiation beam 50 traverses the objective lens 30, from its entrance surface to its exit surface, and then reaches the optical structure 52. The parts 52a and 52b transmit the radiation beam 32, since the wavelength of this beam equals λ2. And the radiation beam 50 emerges from the objective lens 30, via its exit surface and the optical structure 52, in the form of the converging radiation beam 51. Finally, the plano-convex lens 31 transforms the converging radiation beam 51 to the focused beam 56, so as to form the spot 53 on the information layer 47. In other words, when the lens system 24 operates as a "refractive system," the radiation beam traversing the objective system is transmitted from the radiation source 26 to the information layer 47, without being reflected.

It is to be noted that the radiation beam 32 reflects at least twice within the lens system 24 (on the central part 52b and on the marginal part 51b) and then emerges from the marginal part 52a. This leads to a change in focal length with respect to the "second mode." As a result, when the optical scanning device operates in the "second mode," the free working distance "fwd" can even be increased with respect to the "first mode."

It is to be appreciated that numerous variations and modifications may be employed in relation to the embodiments described above, without departing from the scope of the invention which is defined in the appended claims.

As an alternative of the embodiment described with reference to FIG. 3, the design of the first objective lens may differ from the design of the objective lens 30, as shown in FIG. 3.

By way of illustration only, FIG. 8 shows a second embodiment of the first objective lens and of the first and second optical structure, that are designated by the numerals 30', 51' and 52', respectively. Similarly to the objective lens 30 shown in FIG. 3, the first optical structure 51' includes a first part 51a', a second part 51b' and a third part 51c' and the second optical structure 52' includes a fourth part 52b', a fifth part 52a' and a sixth part 52c', the parts 51a' through 52c' having optical properties that are similar to those of the parts 51a through 52c, respectively. However, as shown in FIG. 8, the part 52a' is a central part (that is, an area centered on the optical axis 33) and the part 52b' is a marginal part (that is, an annular area around the central part 52a'), whereas the part 52a is a marginal part and the part 52b is a central part, as shown in FIG. 3. Furthermore, the part 52a' may be made, e.g., by a fifth coating that is similar to the first coating described in Table 1 and that is deposited on a central part 30c' of the exit surface of the objective lens 30' and the part 52b' may be made, e.g., by a sixth coating that is similar to the second coating described in Table 2 and that is deposited on a marginal part 30d' of the exit surface of the objective lens 30'.

It is noted in the preferred second embodiment that entrance surface of the objective lens 30' is substantially curved and that the exit surface of that objective lens 30' is substantially flat.

When the second embodiment is operating in "first mode," the radiation beam 32 reaches the optical structure 51'. The part 51a' transmits the collimated radiation beam 32, since the wavelength of this beam equals λ1. The radiation beam 32 enters the objective lens 30', via its entrance surface. The objective lens 30' transmits the radiation beam 32, since the wavelength of this beam equals λ1. Thus, the radiation beam 32 traverses the objective lens 30', from its entrance surface to its exit surface, and then reaches the optical structure 52'. The part 52b' reflects the radiation beam 32', since the wavelength of this beam equals λ1. The radiation beam 32 then traverses the objective lens 30', from its exit surface to its entrance surface, and then reaches the optical structure 51'. The part 51b' reflects the radiation beam 32, since the wavelength of this beam equals λ1. The radiation beam 32 then traverses again the objective lens 30', from its entrance surface to its exit surface, and then reaches the optical structure 52'. The part 52a' transmits the radiation beam 32, since the wavelength of this beam equals λ1. The radiation beam 32 emerges from the objective lens 30', via its exit surface and the optical structure 52', in the form of the converging radiation beam 34.

When the second embodiment is operating in the "second mode," the radiation beam 50 reaches the optical structure 51'. The parts 51a' and 51b' transmit the collimated radiation beam 50, since the wavelength of this beam equals λ2. The radiation beam 50 enters the objective lens 30', via its entrance surface. The objective lens 30' transmits the radiation beam 50, since the wavelength of this beam equals λ2. Thus, the radiation beam 50 traverses the objective lens 30', from its entrance surface to its exit surface, and then reaches the optical structure 52'. The parts 52a' and 52b' transmit the radiation beam 32, since the wavelength of this beam equals λ2. And the radiation beam 50 emerges from the objective lens 30', via its exit surface and the optical structure 52', in the form of the converging radiation beam.

It is to be noted that the radiation beam 32 reflects at least twice between the marginal part 52b' and on the marginal part 51b' and then emerges from the central part 52a'.

FIG. 9 shows a third embodiment of the first objective lens and of the first and second optical structure, that are designated by the numerals 30", 51" and 52", respectively. Similarly to the objective lens 30 shown in FIG. 3, the first optical structure 51" includes a first part 51a", a second part 51b" and a third part 51c" and the second optical structure 52" includes a fourth part 52b", a fifth part 52a" and a sixth part 52c", the parts 51a" through 52c" having optical properties that are similar to those of the parts 51a through 52c, respectively. However, there are two differences between the two embodiments shown in FIGS. 3 and 9. Firstly, the part 51b" is a central part (that is, an area centered on the optical axis 33) and the part 51a" is a marginal part (that is, an annular area around the central part 51b"), whereas the part 51a is a central part and the part 51b is a marginal part. Secondly, the part 52a" is a central part (that is, an area centered on the optical axis 33) and the part 52b" is a marginal part (that is, an annular area around the central part 52a"), whereas the part 52a is a marginal part and the part 52b is a central part. Furthermore, the part 52a" may be made, e.g., by a seventh coating that is similar to the first coating described in Table 1 and that is deposited on a central part 30c" of the exit surface of the objective lens 30" and the part 52b" may be made, e.g., by an eighth coating that is similar to the second coating described in Table 2 and that is deposited on a marginal part 30d" of the exit surface of the objective lens 30".

Furthermore, it is noted that the configuration of the third embodiment 30" operating in the high mode (with the first radiation beam 27) is known from the article by Hiroshi Hatano et al., entitled "A Plano-Convex Solid Immersion Mirror with a Small Aperture for Near-field Optical Data Storage", International Symposium on Optical Memory 2001 (ISBN 4-89114-018-6). Said article teaches a plano-convex solid immersion mirror formed by a lens having an entrance surface and an exit surface, a first structure arranged on said entrance surface and a second structure arranged on said exit surface, these first and second surfaces including parts which are reflective for one wavelength. However, it is not known from this article that these parts are formed to be transmissive for another wavelength.

It is noted in the preferred third embodiment that entrance surface of the objective lens 30" is substantially flat and that the exit surface of that objective lens 30" is substantially curved.

When the third embodiment is operating in "first mode," the radiation beam 32 reaches the optical structure 51". The part 51a" transmits the collimated radiation beam 32, since the wavelength of this beam equals λ1. The radiation beam 32 enters the objective lens 30", via its entrance surface. The objective lens 30" transmits the radiation beam 32, since the wavelength of this beam equals λ1. Thus, the radiation beam 32 traverses the objective lens 30", from its entrance surface to its exit surface, and then reaches the optical structure 52". The part 52b" reflects the radiation beam 32", since the wavelength of this beam equals λ1. The radiation beam 32 then traverses the objective lens 30", from its exit surface to its entrance surface, and then reaches the optical structure 51". The part 51b" reflects the radiation beam 32, since the wavelength of this beam equals λ1. The radiation beam 32 then traverses again the objective lens 30", from its entrance surface to its exit surface, and then reaches the optical structure 52". The part 52a" transmits the radiation beam 32, since the wavelength of this beam equals λ1. The radiation beam 32 emerges from the objective lens 30", via its exit surface and the optical structure 52", in the form of the converging radiation beam 34.

When the third embodiment is operating in the "second mode," the radiation beam 50 reaches the optical structure 51". The parts 51a" and 51b" transmit the collimated radiation beam 50, since the wavelength of this beam equals λ2. The radiation beam 50 enters the objective lens 30", via its entrance surface. The objective lens 30" transmits the radiation beam 50, since the wavelength of this beam equals λ2. Thus, the radiation beam 50 traverses the objective lens 30", from its entrance surface to its exit surface, and then reaches the optical structure 52". The parts 52a" and 52b" transmit the radiation beam 32, since the wavelength of this beam equals λ2. And the radiation beam 50 emerges from the objective lens 30", via its exit surface and the optical structure 52", in the form of the converging radiation beam.

It is to be noted that the radiation beam 32 reflects at least twice between the marginal part 52b" and on the central part 51b" and then emerges from the central part 52a".

It is noted that the objective lens 30', 30" and the optical structures 51', 51" and 52', 52" as shown in FIGS. 8 and 9 are particularly suitable for "near-field applications," since they allow the scanning device to operate with a radiation beam having a numerical aperture higher than 1, while the free working distance is less than the wavelength of the scanning spot. As another alternative, the lens system may operate as a catadioptric system in a mode that corresponds to the "second mode" and as a refractive system in a mode that corresponds to the "first mode," e.g., by forming the first and second optical structures with coatings the optical properties of which accordingly transmits or reflects the first and second radiation beams.

As another alternative, radiation beams having different wavelengths and numerical apertures than those described above may be used. In such a case, the central and marginal parts of the first and second optical structures are formed so as be transmissive and/or reflective for these radiation beams as the structures described above in relation to FIGS. 3 through 5 are transmissive and/or reflective for the radiation beams described above. For instance, the optical scanning device according to the invention may be formed to be suitable for scanning, e.g., both a carrier of a DVD-format and a carrier of a CD-format, or both a carrier of DVR-format and a carrier of CD-format.

As another alternative, the first and second optical structures as shown in FIGS. 3 through 5 may be made of coatings that are sensitive to the polarization of the first and second radiation beams, instead of being, or in addition to be, sensitive to the wavelengths of the first and second radiation beams as the coatings described above in relation to FIGS. 3 through 5. Such polarization-sensitive coatings are known from, inter alia, the book by MacLeod, "Thin-film optical filters" (ISBN 0-85274-784-5).

As another alternative, the first and second information layers shown in FIGS. 2A through 5 may be part of the same optical record carrier instead of being part of two separate optical record carriers as shown in FIGS. 2A and 2B.

As another alternative, the optical scanning device may be of the type capable of performing simultaneous multi-track scanning. This results in improving data read-out in the "reading mode" as described, for example, in U.S. Pat. No. 4,449,212. It may also apply to multi-track scanning. The description of the multi-tracking arrangement according to U.S. Pat. No. 4,449,212 is incorporated herein by reference.

As an improvement of the embodiment described with reference to FIGS. 2A through 3, the generation of spherical aberration due to the difference in thickness between the transparent layers of the first and second optical record carriers may be corrected by making, e.g., the exit surface of the first objective lens or the entrance surface of the second objective lens aspherically curved. For instance, such an aspherical surface may be formed on a flat surface by using the process know from, e.g., B. H. W. Hendriks and P. G. J. M. Nuyens, "Designs and manufacturing of far-field high NA objective lenses for optical recording," 413–414, SPIE 3749 (1999).

Finally, it is to be noted that the objective lens and the first and second optical structures, as shown in FIGS. 3 through 5, may also be used in a lens system for transforming a first radiation beam to a first converging radiation beam having a first numerical aperture and a second radiation beam to a second converging radiation beam having a second numerical aperture different from the first numerical aperture, the system having one optical axis and including:

an objective lens having an entrance surface for receiving said first and second radiation beams and an exit surface for outputting said first and second converging radiation beams, the lens being transmissive for said first and second radiation beams, a first optical structure arranged facing the entrance surface of said objective lens, this structure including a first part which is transmissive for said first radiation beam, a non-overlapping second part which is reflective for said first radiation beam, and a third part which is transmissive for said second radiation beam, and a second optical structure arranged facing the exit surface of said objective lens, this structure including a fourth part which is reflective for said first radiation beam, a non-overlapping fifth part which is transmissive for said first radiation beam, and a sixth part which is transmissive for said second radiation beam.

The invention claimed is:

1. An optical scanning device for scanning a first information layer (23) of a first optical record carrier (21) with a first radiation beam (27) and a second information layer (47) of a second optical record carrier (45) with a second radiation beam (49), the device including:

a radiation source (26) for supplying said first and second radiation beams, and a lens system (24) having one optical axis (33) and operating: as a catadioptric system for said first radiation beam in order to transform this beam to a first focused radiation beam (35) having a first numerical aperture (NA1) so as to form a first scanning spot (36) in the position of said first information layer, and as a refractive system for said second radiation beam in order to transform this beam to a second focused radiation beam (56) having a second numerical aperture (NA2), different from said first numerical aperture, so as to form a second scanning spot (53) in the position of said second information layer.

2. The optical scanning device as claimed in claim 1, characterized in that said lens system (24) includes:
a first objective lens (30, 30', 30") having an entrance surface facing said radiation source (26) and an exit surface facing the positions of said first and second information layers, this lens being transmissive for said first and second radiation beams,
a first optical structure (51, 51', 51") arranged between said radiation source and the entrance surface of said first objective lens, this structure including a first part (51a, 51a', 51a") which is transmissive for said first radiation beam, a non-overlapping second part (51b, 51b', 51b") which is reflective for said first radiation beam, and a third part (51c, 51c', 51c") which is transmissive for said second radiation beam, and
a second optical structure (52, 52', 52") arranged between the exit surface of said first objective lens and the positions of said first and second information layers, this structure including a fourth part (52b, 52b', 52b") which is reflective for said first radiation beam, a non-overlapping fifth part (52a, 52a', 52a") which is transmissive for said first radiation beam, and a sixth part (52c, 52c', 52c") which is transmissive for said second radiation beam.

3. The optical scanning device as claimed in claim 2, characterized in that said first part (51a) and said second part (51b) are a central part and a marginal part with respect to said optical axis, respectively, and said fifth part (52a) and said fourth part (52b) are arranged a marginal part and a central part with respect to said optical axis, respectively.

4. The optical scanning device as claimed in claim 2, characterized in that said first part (51a') and said second part (51b') are a central part and a marginal part with respect to said optical axis, respectively, and said fifth part (52a') and said fourth part (52b') are arranged a central part and a marginal part with respect to said optical axis, respectively.

5. The optical scanning device as claimed in claim 2, characterized in that said first part (51a") and said second part (51b") are a marginal part and a central part with respect to said optical axis, respectively, and said fifth part (52a") and said fourth part (52b") are arranged a central part and a marginal part with respect to said optical axis, respectively.

6. The optical scanning device as claimed in claim 3, characterized in that:
said first part (51a, 51a', 51a") is made of a first coating that is transmissive for said first radiation beam,
said second part (51b, 51b', 51b") is made of a second coating that is reflective for said first radiation beam,
said third part (51c, 51c', 51c") is made of said first and second coatings which are further transmissive for said first and second radiation beams,
said fourth part (52b, 52b', 52b") is made of a third coating that is reflective for said first radiation beam,
said fifth part (52a, 52a', 52a") is made of a fourth coating that is transmissive for said first radiation beam, and
said sixth part (52c, 52c', 52c") is made of said first and second coatings which are further transmissive for said first and second radiation beams.

7. The optical scanning device as claimed in claim 1, characterized in that said second numerical aperture (NA2) is smaller than said first numerical aperture (NA1).

8. The optical scanning device as claimed in claim 2, characterized in that said lens system further includes a second objective lens (31) that forms, in cooperation with said first objective lens (30, 30', 30"), a doublet-lens system.

9. The optical scanning device as claimed in claim 1, characterized in that said detection system (39) is further arranged for providing a focus error signal ($I_{focus}$) and/or a radial-tracking error signal ($I_{radial}$) and in that it further includes a servosystem (42A) and an actuator (42B, 42C) responsive to said focus error signal and/or said radial-tracking error signal for controlling the positions of said first and second scanning spots (36, 53) with respect to the respective positions of said first and second information layers (23, 47) and/or of a track of said first and second information layers which is to be scanned.

10. The optical scanning device (1) as claimed in claim 1, characterized in that it further includes an information processing unit (42D) for error correction of the information extracted from said first and second information layers.

11. A lens system (24) for transforming a first radiation beam (27) to a first converging radiation beam (34) having a first numerical aperture (NA1) and a second radiation beam (49) to a second converging radiation beam (51) having a second numerical aperture (NA2) different from said first numerical aperture, the system having one optical axis (33) and including:
a first objective lens (30, 30', 30") having an entrance surface for receiving said first and second radiation beams and an exit surface for outputting said first and second converging radiation beams, the lens being transmissive for said first and second radiation beams,
a first optical structure (51, 51', 51") arranged facing the entrance surface of said first objective lens, this structure including a first part (51a, 51a', 51a") which is transmissive for said first radiation beam, a non-overlapping second part (51b, 51b', 51b") which is reflective for said first radiation beam, and a third part (51c, 51c', 51c") which is transmissive for said second radiation beam, and
a second optical structure (52, 52', 52") arranged facing the exit surface of said first objective lens, this structure including a fourth part (52b, 52b', 52b") which is reflective for said first radiation beam, a non-overlapping fifth part (52a, 52a', 51a") which is transmissive for said first radiation beam, and a sixth part (52c, 52c', 52c") which is transmissive for said second radiation beam.

* * * * *